United States Patent Office 3,632,831
Patented Jan. 4, 1972

3,632,831
SYNTHESIS OF DIALKYL 4,4'-BIPHENYL-DICARBOXYLATES
Richard N. Knowles, Hockessin, Del., assignor to E. I. du Pont de Nemours and Company, Wilmington, Del.
No Drawing. Filed Jan. 3, 1969, Ser. No. 788,952
Int. Cl. C07c 69/76
U.S. Cl. 260—475 R
5 Claims

ABSTRACT OF THE DISCLOSURE

Dialkyl 4,4' - biphenyldicarboxylates are prepared by heating under pressure a 4,4'-biphenyldihalide, dimethylcarbonate or diethylcarbonate and 0.01 to 50 mole percent of palladium per mole of 4,4'-biphenyldihalide. Inert solvents such as xylene can be used if desired.

This invention relates to a process for the production of dialkyl 4,4'-biphenyldicarboxylates where said alkyl is methyl or ethyl. This process is illustrated by the following reaction scheme:

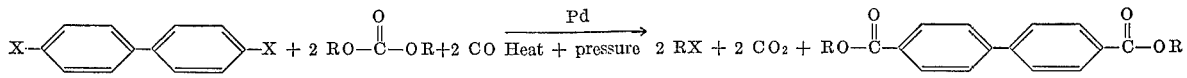

where X is chlorine, bromine or iodine and R is methyl or ethyl. The preferred halide is bromine and under optimum conditions yields in excess of 95% with a purity of 99% can be obtained.

DESCRIPTION OF THE INVENTION

The primary reactant is a 4,4'-biphenyldihalide where either the dichloro, the dibromo, or the diiodo material can be employed. The use of the dibromo compound is preferred. In addition to the dihalide, there is used between 10–500% mole excess of diethylcarbonate or dimethylcarbonate; between 100–300% excess is preferred. A large excess of carbonate serves as a solvent for the reaction. However, the reaction consumes two moles of either carbonate per mole of product. The reaction also requires sufficient carbon monoxide to provide at least 2 moles of carbon monoxide per mole of the diphenyldihalide material consumed.

Elemental palladium, palladium salts such as $PdCl_2$ or $Pd(NO_3)_2$ or palladium oxides can be used to catalyze the reaction, but the use of these finely-divided materials is less convenient than is the use of a supported palladium catalyst because of separation problems. The preferred catalyst is elemental palladium on carbon. Other supports which are useful include $\gamma$-$Al_2O_3$, $\eta$-$Al_2O_3$, $k$-$Al_2O_3$, $x$-$Al_2O_3$, silica, titania, zirconia, kieselguhr, mixed rare earth oxides or carbonates, barium carbonates, barium sulfate, calcium carbonate, pumice, silica-alumina mixtures, and a variety of molecular sieves. A typical supported catalyst contains 5% elemental palladium. These palladium catalysts not only give excellent results, but are less toxic than other metal carbonyl-type catalysts. Between 0.01–50 mole percent of palladium based on the biphenyldihalide starting material is used to catalyze the reaction; 0.1–5 mole percent is preferred. The supported palladium catalysts are better suited for use in continuous reactors than other metal carbonyl catalysts because they are solid and can be mounted in fixed beds.

This reaction may be carried out in a bomb reactor, which, after the addition of the reactants and catalyst, is charged at room temperature with enough carbon monoxide to give at least 2 moles per mole of the biphenyldihalide. In experimentation, a charge of about 100 to 5,000 pounds per square inch gauge for a 400 cc. bomb reactor charged at room temperature is used for the batch process.

The bomb reactor is generally heated above 150° C. causing a pressure increase. Reaction pressures have been utilized which are as high as 12,000 p.s.i.g., but such pressures depend more upon the type of reaction vessel than on the process itself. Usually the reaction proceeds at pressures between 300 to 7000 p.s.i.g. Reaction temperatures are generally maintained above 150° C. to 350° C. for a period of 10 minutes to 3 hours. Higher temperatures and longer reaction times can be used but they are usually undesirable. Temperatures above 300° C. when maintained for more than a half hour, will begin to slowly decompose the reaction product which naturally affects the reaction yield. Preferably, when the primary reactant is 4,4'-biphenyldibromide, the reaction is maintained for one hour at a temperature of about 225° C. to 275° C. and a pressure of about 500 to 1500 p.s.i.g. Reaction conditions can easily be empirically determined for each reaction, since conditions can vary depending primarily upon the specific 4,4'-biphenyldihalide which is selected for the reaction.

This reaction may also be carried out in a continuous manner in a stirred autoclave or in a pipeline reactor. Suitable conditions for this type of operation are pressures of approximately 1000 p.s.i. of carbon monoxide, temperatures in the 300–325° C. range, and reaction times of about 15 minutes. Naturally the conditions can be varied but the pressures will not be as high as that of the batch reaction.

Solvents which do not contain an active hydrogen, such as xylene, acetonitrile, and toluene, can be used in this reaction, but it is more convenient to let excess carbonate serve as solvent during the reaction step. Although small amounts of moisture can be tolerated, the reaction should be carried out under anhydrous conditions for best results.

After the carbonylation reaction is complete, the reaction mixture is cooled. The product and catalyst are slurried in a boiling solvent suitable for the recrystallization of the reaction product. Suitable solvents include xylene, acetonitrile, decalin, diisopropylbenzene, and toluene. The heated slurry is filtered to remove the catalyst.

When dimethyl 4,4'-biphenyldicarboxylate is prepared from this reaction using 4,4'-biphenyldibromide, the product is often obtained in a purity of better than 99 percent. An additional advantage of this process is that the methyl or ethyl halide by-product can be recovered by conventional methods if desired.

The reaction products of this invention are useful as polymer intermediates.

Example 1

A 400 cc. stainless steel bomb is charged with 12.5 g. of 4,4'-dibromobiphenyl, 45.0 g. of dimethylcarbonate and 5 g. of 5% palladium on carbon. The bomb is purged with nitrogen and pressurized to 1500 p.si.g. with carbon monoxide. The bomb is sealed, and placed in a rack where it can be both heated and shaken. The agitating mixture is heated for a period of 3 hours at 250° C. under autogenous pressure (3200–3400 p.s.i.g.). The bomb is cooled to ambient temperature, and the unused carbon monoxide and by-product carbon dioxide and methyl bromide are vented. The methyl bromide can be easily collected in traps immersed in an acetone-Dry Ice bath if desired. The slurry from the bomb is boiled in about 350 ml. of xylene, and filtered hot. The residual palladium on carbon catalyst is washed with an additional 200 ml. of boiling xylene. The combined filtrate and wash are concentrated to 300 ml., and cooled to room temperature.

The dimethyl 4,4′-biphenyldicarboxylate crystallizes from the colorless filtrate as long, broad needles which are filtered and washed with 100 ml. of xylene. In a normal reaction 8.5–9.0 g. of product melting at 214–216° C. is isolated.

The xylene filtrate is stripped in vacuum leaving about 1 g. of residue consisting of dimethyl 4,4′-byphenyldicarboxylate, methyl (4-4-bromophenyl) benzoate, and 4,4′-dibromobiphenyl. Occasionally small quantities of 4-bromobiphenyl and methyl 4-phenylbenzoate are also observed in the residue.

Both the residue and the dimethyl 4,4′-biphenyldicarboxylate are analyzed by gas-liquid chromatography using a ¼″ x 10′ column packed with 3% OV–17 on Gas Chrom Q. The instrument is programmed from 185 to 285° C. at 60° C./min. Quinoline used as internal standard. Dimethyl 4,4′ biphenyldicarboxylate prepared by this process is usually obtained in better than 99% purity.

Example 2

A 400 cc. stainless steel bomb is charged with 12.5 g. of 4,4′-dibromobiphenyl, 14.5 g. of dimethylcarbonate and 5 g. of 5% palladium on carbon. The bomb is purged with nitrogen, and pressurized to 375 p.s.i.g. with carbon monoxide. The bomb is sealed, and placed in a rack where it can be both heated and shaken. The agitating mixture is heated for a period of 1 hour at 250° C. under autogenous pressure (1000–1100 p.s.i.g.). The dimethyl 4,4′-biphenyldicarboxylate (8.5 g., M.P. 214–216° C.), is isolated and analyzed according to the procedures described in Example 1.

Example 3

A 400 cc. stainless steel bomb is charged with 12.5 g. of 4,4′-dibromobiphenyl, 45.0 g. of dimethylcarbonate and 5 g. of 5% palladium or carbon. The bomb is purged with nitrogen and pressurized to 103 p.s.i.g. with carbon monoxide. The bomb is sealed, and placed in a rack where it can be both heated and shaken. The agitating mixture is heated for a period of 1 hour at 250° C. under autogenous pressure (750–800 p.s.i.g.). The dimethyl 4,4′-biphenyldicarboxylate (7.4 g., M.P. 214–216° C.), is isolated and analyzed according to the procedures of Example 1.

Example 4

A 400 cc. stainless steel bomb is charged with 12.5 g. of 4,4′-dibromobiphenyl, 14.5 g. of dimethylcarbonate, and 5 g. of 5% palladium on carbon. The bomb is purged with nitrogen and pressurized to 4800 p.s.i.g. with carbon monoxide. The bomb is sealed, and placed in a rack where it can be both heated and shaken. The agitating mixture is heated for a period of 3 hours at 250° C. under autogenous pressure (11,000 to 11,300 p.s.i.g.). The dimethyl 4,4′-biphenyldicarboxylate (3.2 g.) is isolated and analyzed according to the procedures of Example 1.

Example 5

A 400 cc. stainless steel bomb is charged with 12.5 g. of 4,4′-dibromobiphenyl, 45 g. of dimethylcarbonate and 5 g. of 5% palladium on alumina. The bomb is purged with nitrogen and pressurized to 1500 p.s.i.g. with carbon monoxide. The bomb is sealed, and placed in a rack where it can be both heated and shaken. The agitating mixture is heated for a period of 1 hour at 250° C. under autogenous pressure (3150–3450 p.s.i.g.). The dimethyl 4,4′-diphenyldicarboxylate (7.9 g.) is isolated and analyzed according to the procedures of Example 1.

Example 6

A 400 cc. stainless steel bomb is charged with 12.5 g. of 4,4′-dibromobiphenyl, 45 g. of dimethylcarbonate and 0.35 g. of palladium chloride. The bomb is purged with nitrogen, and pressurized to 1500 p.s.i.g. with carbon monoxide The bomb is sealed and placed in a rack where it can be both heated and shaken. The agitating mixture is heated for a period of 3 hours at 250° C. under autogenous pressure (3500–3600 p.s.i.g.). The dimethyl 4,4′-biphenyldicarboxylate (6.1 g.) is isolated and analyzed according to the procedures of Example 1.

Example 7

A 400 cc. stainless steel bomb is charged with 12.5 g. of 4,4′-dibromobiphenyl, 45 g. of dimethylcarbonate and 5 g. of 5% palladium on carbon. The bomb is purged with nitrogen and pressurized to 1500 p.s.i.g. with carbon monoxide. The bomb is sealed, and placed in a rack where it can be both heated and shaken. The agitating mixture is heated for a period of 3 hours at 300° C. under autogenous pressure (3350–3700 p.s.i.g.). The dimethyl 4,4′-biphenyldicarboxylate (5.5 g.) is isolated and analyzed according to the procedures of Example 1.

Example 8

A 400 cc. stainless steel bomb is charged with 12.5 g. of 4,4′-dibromodiphenyl, 45.0 g. of dimethylcarbonate and 5 g. of 5% palladium on carbon. The bomb is purged with nitrogen and pressurized to 1500 p.s.i.g. with carbon monoxide. The bomb is sealed, and placed in a rack where it can be both heated and shaken. The agitating mixture is heated for a period of 3 hours at 200° C. under autogenous pressure (2000–2600 p.s.i.g.). The dimethyl 4,4′-biphenyldicarboxylate (3.6 g.) is isolated and analyzed according to the procedures of Example 1.

Example 9

A 400 cc. stainless steel bomb is charged with 12.5 g. of 4,4′-dibromobiphenyl, 45 g. of dimethylcarbonate and 5 g. of 5% palladium on carbon. The bomb is purged with nitrogen and pressurized to 1500 p.s.i.g. with carbon monoxide. The bomb is sealed, and placed in a rack where it can be both heated and shaken. The agitating mixture is heated for a period of 15 minutes at 300° C. under autogenous pressure (3500–3600 p.s.i.g.). The dimethyl 4,4′-biphenyldicarboxylate (8.1 g.) is isolated and analyzed according to the procedures of Example 1.

Example 10

A 400 cc. stainless steel bomb is charged with 11.2 g. of 4,4′-dichlorobiphenyl, 18.0 g. of dimethyl-carbonate and 5 g. of 5% palladium on carbon. The bomb is purged with nitrogen and pressurized to 1500 p.s.i.g. with carbon monoxide. The bomb is sealed, and placed in a rack where it can be both heated and shaken. The agitating mixture is heated for a period of 5 hours at 340° C. under autogenous pressure (4600–4800 p.s.i.g.). The dimethyl 44′-biphenyldicarboxylate (5.3 g.) is isolated and analyzed according to the procedures of Example 1.

Example 11

A 400 cc. stainless steel bomb is charged with 16.2 g. of 4,4′-diiodobiphenyl, 45 g. of dimethylcarbonate and 5 g. of 5% palladium on carbon. The bomb is purged with nitrogen and pressurized to 375 p.s.i.g. with carbon monoxide. The bomb is sealed, and placed in a rack where it can be both heated and shaken. The agitating mixture is heated for a period of 15 minutes at 250° C. under autogenous pressure (1000–1100 p.s.i.g.). The dimethyl 4,4′-biphenyldicarboxylate is isolated and analyzed according to the procedures of Example 1.

Example 12

A 400 cc. stainless steel bomb is charged with 16.2 g. of 4,4′-diiodobiphenyl, 45 g. of dimethylcarbonate and 2 g. of 5% palladium on carbon. The bomb is purged with nitrogen and pressurized to 375 p.s.i.g. with carbon monoxide. The bomb is sealed, and placed in a rack where it can be both heated and shaken. The agitating mixture is heated for a period of 3 hours at 175° C. under autogenous pressure. The dimethyl 4,4′-biphenyldicarboxylate is isolated and analyzed according to the procedures of Example 1.

Example 13

A 400 cc. stainless steel bomb is charged with 12.5 g. of 4,4'-dibromobiphenyl, 8.1 g. of dimethylcarbonate, 50 ml. of xylene, and 5 g. of 5% palladium on carbon. The bomb is purged with nitrogen and pressurized to 155 p.s.i.g. with carbon monoxide. The bomb is sealed, and placed in a rack where it can be both heated and shaken. The agitating mixture is heated for a period of 3 hours at 250° C. under autogenous pressure (340–360 p.s.i.g.). The dimethyl 4,4'-biphenyldicarboxylate (3.3 g.) is isolated and analyzed according to the procedures of Example 1.

Example 14

A 400 cc. stainless steel bomb is charged with 12.5 g. of dibromobiphenyl, 59 g. of diethylcarbonate, and 5 g. of 5% palladium on carbon. The bomb is purged with nitrogen and pressurized to 375 p.s.i.g. with carbon monoxide. The bomb is sealed, and placed in a rack where it can be both heated and shaken. The agitating mixture is heated for a period of 3 hours at 250° C. under autogenous pressure. The diethyl 4,4'-biphenyldicarboxylate is isolated and analyzed according to the procedure of Example 1.

Example 15

A stirred, pressure reactor is fitted with heat transfer coils and jacket, baffles, a gas entrainment device, a dip tube and inlet tubes. This reactor is run at 250° C. at a pressure of 1500 p.s.i.g. while 4,4'-dibromobiphenyl is continually introduced as a slurry in dimethylcarbonate, along with 5% palladium on carbon, and carbon monoxide is added to the reactor from a high pressure line. The slurry is fed to the reactor using high pressure, positive displacement pumps. The product slurry is continuously pumped from the reactor to a filter at 250° C. where the palladium on carbon is removed. The dimethyl 4,4'-biphenyldicarboxylate is isolated from the cooled dimethylcarbonate. The reactants and product are pumped into and out of the reactor at such a rate as to have an average residence time of 1 hour.

For each kilogram of 4,4'-dibromobiphenyl fed to the reactor, 75 grams of 5% palladium on carbon and 4 kilograms of dimethylcarbonate are also fed as a slurry to the reactor.

I claim:

1. A process for the preparation of dialkyl 4,4'-biphenyldicarboxylates which comprises reacting under pressure between 300 to 12,000 pounds per square inch a 4,4'-biphenyldihalide where the halide is iodine, bromine or chlorine, dimethylcarbonate or diethylcarbonate and carbon monoxide and separating the resulting dialkyl 4,4'-biphenyldicarboxylate, said reaction occurs in the presence of 0.01 to 50 mole percent of palladium based on said dihalide and a temperature above 150° C.

2. A process as in claim 1 where said reaction is heated to a temperature of about 150° C. to 350° C., the reaction pressure is between 500 to 7000 pounds per square inch, and said carbonate is present in a 100 to 300 percent mole excess.

3. A process as in claim 1 where said palladium is present in an amount of between 0.1 to 5.0 mole percent.

4. A process as in claim 3, where said dihalide is 4,4'-biphenyldibromide.

5. A process as in claim 3 where said carbonate is dimethylcarbonate.

References Cited

UNITED STATES PATENTS

| | | | |
|---|---|---|---|
| 2,565,464 | 8/1951 | Tabet | 260—475 |
| 3,452,090 | 6/1969 | Mador et al. | 260—544 A |
| 3,457,299 | 7/1969 | Closson et al. | 260—486 AC |

LORRAINE A. WEINBERGER, Primary Examiner

E. J. SKELLY, Assistant Examiner